United States Patent [19]

Schön

[11] 4,270,250
[45] Jun. 2, 1981

[54] CLAMPING RING FOR TUBULAR MEMBERS

[76] Inventor: Otmar Schön, Am Kirschenberg 5, D-6601 Scheidtberg, Fed. Rep. of Germany

[21] Appl. No.: 136,318

[22] Filed: Apr. 1, 1980

[30] Foreign Application Priority Data

Apr. 5, 1979 [DE] Fed. Rep. of Germany ... 7909896[U]

[51] Int. Cl.³ .................. F16L 3/10; A44B 21/00
[52] U.S. Cl. .................. 24/263 A; 248/67.5; 248/74 R; 285/373; 24/339
[58] Field of Search .................. 24/263 A, 81 CC; 248/67.5, 74 R, 74 A, 632; 285/373, 328, 55

[56] References Cited

U.S. PATENT DOCUMENTS

| 2,227,528 | 1/1941 | Adler | 248/632 |
| 2,288,158 | 6/1942 | Ellinwood | 248/67.5 |
| 2,890,848 | 6/1959 | Johnson, Jr. | 248/74 R |
| 3,564,676 | 2/1971 | Deser | 248/74 R |
| 3,843,083 | 10/1974 | Angibaud | 248/74 R |
| 3,856,244 | 12/1974 | Menshen | 248/67.5 |

FOREIGN PATENT DOCUMENTS 722083 1/1955 United Kingdom .................. 248/74 R

OTHER PUBLICATIONS

German Gebrauchsmuster 7, 405, 253, 2, 15, 1974, Rolf Schatz Feinwerktechnik KG.

Primary Examiner—Victor N. Sakran
Attorney, Agent, or Firm—Roylance, Abrams, Berdo & Farley

[57] ABSTRACT

An improved clamp for hoses and other tubular members includes two rigid clamping members having semi-circular recesses, one or more annular wedge-shaped grooves in the recesses, and fasteners. An elastomeric insert, or a pair of inserts, has one or more ribs shaped to fit the groove or grooves. The rib height is less than the groove depth leaving an annular gap to improve the clamping action. Inserts of different thickness can be provided to accommodate hoses of different dimensions.

1 Claim, 3 Drawing Figures

CLAMPING RING FOR TUBULAR MEMBERS

This invention relates to a clamping ring for tubular members such as pipes, hoses and the like, and specifically to an improved insert structure therefor.

BACKGROUND OF THE INVENTION

It is well known to provide a clamping ring to engage a tubular member. Commonly, the clamping ring is made in two substantially identical halves, each half having a semi-circular or semi-cylindrical recess so that, when the halves are joined, a tubular passage is formed by the recess to receive the tubular member. Bolts, screws or other fastening devices are then placed through the bodies to join and urge them toward each other, providing the clamping force to engage the tubular member.

It is also known to provide inserts of various types for such tubular members, the inserts commonly being designed to improve the frictional characteristics of the clamping assembly for various purposes. Examples of such prior art clamping rings are found in the following documents:
U.S. Pat. No. 2,288,158; Ellinwood
German Gebrauchsmuster No. 7,405,253; Rolf Schatz, Feinwektechnik KG
German Gebrauchsmuster No. 7,831,579; Walter Stauffenberg, KG

BRIEF DESCRIPTION OF THE INVENTION

An object of the present invention is to provide a clamping ring for various kinds of tubular members which is provided with at least one annular groove in the recess, thereby defining annular points of contact to engage the pipe, and to provide an elastomeric insert structure which permits using the clamping ring with tubular members of various sizes without interfering with the operation of the contact regions.

Briefly described, the invention includes, in an improved clamping ring assembly for clamping a tubular member, the ring being of the type having first and second bodies formed with semi-cylindrical recesses defining a tubular passage to receive the tubular member, at least one annular groove of predetermined depth in each of the recesses, each groove being trapezoidal in cross section and widening toward the opening thereof, and at least one generally semi-cylindrical elastomeric insert having a radially protruding annular rib to engage one of the annular grooves, and means for urging the bodies toward each other with the recesses facing each other, the improvement wherein each said annular rib is trapezoidal in cross section and is shaped to be received in its associated groove substantially without distortion, and wherein the radial dimension of each said rib is significantly smaller than the depth of the associated groove so that a gap remains between the rib and the bottom of the groove when the insert and the bodies are assembled.

As will be recognized, the clamping ring and the insert are mutually adapted in such a way that the rib of the insert serves only for securing its position in the clamping ring against axial movement and that only those portions of the insert which lie beside the ribs press against the pipe, hose or the like, under tension whenever the clamping ring is assembled and tightened. The same fit of the insert against the tubular member will be achieved as with a clamping ring fitting directly against the tubular member. Because of this arrangement, the cylindrical portions of the inserts can be made in various thicknesses, thus permitting the assembly to be used with a range of sizes of tubular members, simply by selecting different thicknesses of inserts while the rigid, metal portions of the clamping ring assembly, the main bodies themselves, need only be made in a single size. This is of particular advantage in the commercial clamping rings.

The tubular member is held by the ridges or ribs formed in the clamping ring itself by the annular recesses, even when the insert is used. Because of this, multiple clamping with a good distribution of the holding force is achieved and only slight specific pressure occurs.

In order that the manner in which the foregoing and other objects are obtained in accordance with the invention can be understood in detail, a particularly advantageous embodiment thereof will be described with reference to the accompanying drawings, which form a part of the specification and wherein.

Figure 1:
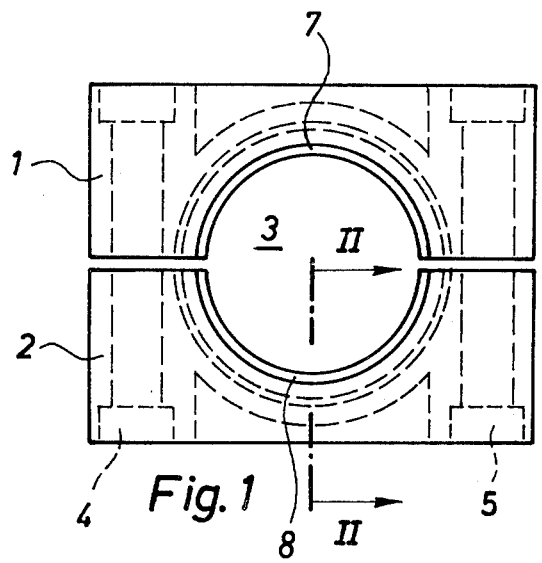
FIG. 1 is a side elevation of a clamping ring assembly in accordance with the invention.

The clamping ring assembly shown in FIG. 1 includes two holding bodies 1 and 2, each body being provided with a semi-cylindrical or semi-circular recess for the reception of a pipe, hose or other tubular member. At both sides of the recess in each body there are bores 4 and 5 extending perpendicular to the central axis of the tubular passage defined by the recesses to receive an attachment device for interconnecting bodies 1 and 2. Bolts, screws or the like can thus be inserted through these bores to assemble the body and urge them toward each other, clamping a tubular member placed between the bodies.

Figure 2:
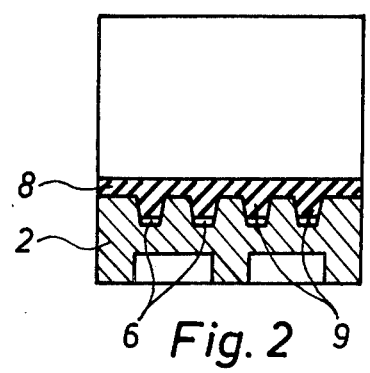
FIG. 2 is a transverse section along line II—II of FIG. 1.

Each of the bodies 1 and 2 is provided with a plurality of annular grooves 6, each groove having a trapezoidal cross section and each groove generally lying in a plane transverse to the body, i.e., perpendicular to the axis of the tubular passage formed between the assembled body. The grooves are preferably uniformly spaced apart in the axial direction, as shown in FIG. 2, and each groove is trapezoidal in cross section with the wider portion of the trapezoid being at the open end of each groove. Stated differently, each groove expands in the shape of a wedge toward the inside of the center of the tubular passage 3.

Figure 3:
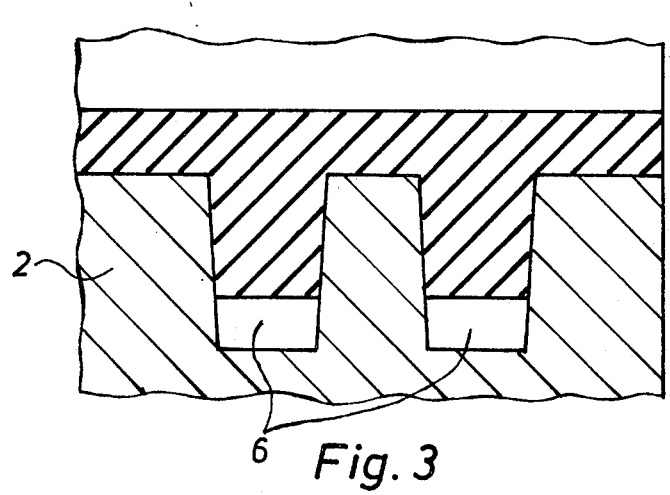
FIG. 3 is an enlarged fragmentary view of a portion of FIG. 2 showing the grooves and ribs in greater detail.

Each of bodies 1 and 2 is provided with an interior insert 7 or 8 of elastomeric material such as natural or synthetic rubber. Each insert is in the shape of a semi-cylindrical shell and has at least one but preferably a plurality of annular ribs 9 projecting radially outwardly from the outer surface thereof, the ribs being equally spaced so as to mate with grooves 6. As seen in FIGS. 2 and 3, each rib is trapezoidal in shape and dimensioned to fit the grooves 6 snugly but without distortion. In other words, the tolerances of the ribs are selected such that it is not necessary to force the ribs into the grooves. Each groove 6 is formed with a predetermined depth, and the ribs are dimensioned so that the radial protrusion of each rib is significantly less than the depths of the grooves. Thus, when the inserts are assembled to the bodies a gap remains at the bottom of each groove as clearly illustrated in FIG. 3.

Because of the provision of the gap, when the bodies are urged toward each other by the clamping fasteners, the protrusions lying between grooves 6 will apply force through the elastomeric body to perform the clamping function. Thus, the elastomeric insert does not degrade or change significantly the clamping force supplied by the outer rigid body which is, normally, formed from metal.

As will be recognized, a single insert can be employed rather than the two inserts illustrated in FIGS. 1 and 3. In this case, the insert is formed as an elongated strip, again having the ribs shaped as shown in FIGS. 2 and 3, the strip being slightly shorter than the inner circumference of the recess formed by the two assembled bodies 1 and 2. Thus, when the strip is placed within the clamping ring bodies a small gap will remain between the two distal ends thereof, allowing the bodies to be tightened toward each other. The principle is precisely the same, however, as when two inserts are employed.

While certain advantageous embodiments have been chosen to illustrate the invention it will be understood by those skilled in the art that various changes and modifications can be made therein without departing from the scope of the invention as defined in the appended claims.

What is claimed is:

1. In an improved clamping ring assembly for clamping a tubular member, the ring being of the type having first and second bodies formed with semi-cylindrical recesses defining a tubular passage to receive the tubular member, at least one annular groove of predetermined depth in each of said recesses, each said groove being trapezoidal in cross section widening toward the opening thereof, and at least one generally semi-cylindrical elastomeric insert being a radially protruding rib to engage one of said annular grooves, and means for urging said bodies toward each other with said recesses facing each other, the improvement wherein each said annular rib is trapezoidal in cross section and is shaped to be received in its associated groove substantially without distortion, and the radial dimension of each said rib is significantly smaller than the depth of the associated groove so that a gap remains between the rib and the bottom of the groove when the insert and bodies are assembled.

* * * * *